(12) United States Patent
Joseph, III

(10) Patent No.: US 12,728,367 B2
(45) Date of Patent: Sep. 8, 2026

(54) EVAPORATION SYSTEM

(71) Applicant: Thomas A. Joseph, III, Sewickley, PA (US)

(72) Inventor: Thomas A. Joseph, III, Sewickley, PA (US)

(*) Notice: Subject to any disclaimer, the term of this patent is extended or adjusted under 35 U.S.C. 154(b) by 0 days.

(21) Appl. No.: 18/758,433

(22) Filed: Jun. 28, 2024

(65) Prior Publication Data

US 2025/0319420 A1 Oct. 16, 2025

Related U.S. Application Data

(60) Provisional application No. 63/633,533, filed on Apr. 12, 2024.

(51) Int. Cl.

*B01D 1/14* (2006.01)
*B01D 1/00* (2006.01)
*B01D 1/30* (2006.01)
*C02F 1/16* (2023.01)
*F02C 6/18* (2006.01)
*G05B 13/04* (2006.01)

(52) U.S. Cl.

CPC ............ *B01D 1/14* (2013.01); *B01D 1/0058* (2013.01); *B01D 1/0076* (2013.01); *B01D 1/0082* (2013.01); *B01D 1/30* (2013.01); *C02F 1/16* (2013.01); *F02C 6/18* (2013.01); *G05B 13/04* (2013.01)

(58) Field of Classification Search

CPC .. B01D 1/0058; B01D 1/0076; B01D 1/0082; B01D 1/14; B01D 1/30; C02F 1/16
See application file for complete search history.

(56) References Cited

U.S. PATENT DOCUMENTS

| | | | | |
|---|---|---|---|---|
| 3,815,332 | A | 6/1974 | Bobrowsky et al. | |
| 3,971,642 | A | 7/1976 | Perez | |
| 3,976,456 | A | 8/1976 | Alcock | |
| 4,247,308 | A | 1/1981 | Calvert et al. | |
| 4,534,828 | A * | 8/1985 | Erickson | B01D 3/346 203/1 |
| 4,609,386 | A | 9/1986 | Sibley et al. | |
| 4,676,811 | A | 6/1987 | Wade | |
| 4,762,686 | A | 8/1988 | Lehto | |
| 6,036,756 | A | 3/2000 | Gohara et al. | |
| 6,214,097 | B1 | 4/2001 | Laslo | |
| 6,267,804 | B1 | 7/2001 | Marlowe | |
| 6,322,763 | B1 | 11/2001 | McDaniel | |
| 6,936,140 | B2 * | 8/2005 | Paxton | C02F 1/04 159/901 |
| 7,073,337 | B2 * | 7/2006 | Mangin | C02F 1/16 60/783 |
| 7,861,511 | B2 | 1/2011 | Chillar et al. | |
| 8,425,668 | B2 * | 4/2013 | Lakatos | B03D 1/1462 95/266 |

(Continued)

FOREIGN PATENT DOCUMENTS

| | | | |
|---|---|---|---|
| DK | 172993 | B1 | 11/1999 |
| EP | 2862608 | A4 | 4/2015 |
| KR | 100860399 | B1 | 9/2008 |

*Primary Examiner* — Jonathan Miller
(74) *Attorney, Agent, or Firm* — The Belles Group, P.C.

(57) ABSTRACT

A water evaporation system comprising a gas turbine engine is disclosed. The exhaust of the gas turbine engine directly impinges on wastewater to entrain and evaporate at least a portion of the wastewater.

22 Claims, 9 Drawing Sheets

(56) References Cited

U.S. PATENT DOCUMENTS

| | | | | |
|---|---|---|---|---|
| 8,460,509 | B2 * | 6/2013 | Lakatos | B01B 1/00 203/1 |
| 8,545,681 | B2 * | 10/2013 | Shapiro | C02F 1/16 159/24.2 |
| 8,679,291 | B2 * | 3/2014 | Duesel, Jr. | B01D 1/305 210/768 |
| 8,801,897 | B2 * | 8/2014 | Duesel, Jr. | C02F 1/10 203/28 |
| 9,770,671 | B2 * | 9/2017 | Curlett | E02B 15/042 |
| 9,844,752 | B2 | 12/2017 | Molgaard | |
| 10,207,247 | B2 | 2/2019 | Fedorov | |
| 10,927,026 | B1 * | 2/2021 | Eshelman | C02F 1/048 |
| 11,390,538 | B2 * | 7/2022 | Eshelman | F02C 6/18 |
| 2004/0045682 | A1 * | 3/2004 | Liprie | B01D 1/0094 159/31 |
| 2006/0000355 | A1 * | 1/2006 | Ogura | C02F 1/265 95/224 |
| 2011/0100924 | A1 * | 5/2011 | Duesel, Jr. | C02F 1/048 210/710 |
| 2011/0140457 | A1 * | 6/2011 | Lakatos | B03D 1/1462 210/639 |
| 2011/0147195 | A1 * | 6/2011 | Shapiro | C02F 1/16 203/10 |
| 2012/0247942 | A1 * | 10/2012 | Curlett | B01D 53/78 202/153 |
| 2017/0209824 | A1 | 7/2017 | Abbott | |
| 2021/0380436 | A1 * | 12/2021 | Eshelman | F02C 6/18 |

* cited by examiner 200
145
100
220
286
215
245
210
246
247
235
250
248
258
276
278
277
265
275
260

EVAPORATION SYSTEM

CROSS REFERENCE TO RELATED APPLICATION

This application claims priority under 35 U.S.C. § 119 (e) to U.S. Provisional Patent Application No. 63/633,533, entitled GAS TURBINE ENGINE POWERED SUBMERGED COMBUSTION EVAPORATION SYSTEM, which was filed on Apr. 12, 2024, the entire disclosure of which is incorporated by reference herein.

BACKGROUND

In various instances, industrial wastewater must be accumulated and then treated before being released back into the environment. In at least one such instance, the drilling and/or operation of a natural gas well, for example, produces high salinity wastewater. In many instances, the high salinity wastewater is accumulated in a tank that is in a remote location and then transported from the remote location to be treated. Transporting the wastewater in this manner can be difficult and/or expensive.

SUMMARY

In at least one form, the invention comprises a water evaporation system comprising a gas turbine engine and an evaporation tank. The gas turbine engine comprises an air compressor, a burner in fluidic communication with the air compressor, a rotatable shaft, and an exhaust outlet in communication with the burner configured to receive heated air from the burner. The evaporation tank comprises an exhaust inlet in communication with the exhaust outlet of the gas turbine engine, a water supply system, and a boiling chamber in communication with the exhaust inlet, wherein the boiling chamber is configured to receive water from the water supply system and direct heated exhaust from the gas turbine engine directly onto the water to evaporate at least a portion of the water.

In at least one form, the invention comprises a gas turbine engine for use with a water evaporation tank, the gas turbine engine comprising an air compressor, a burner in fluidic communication with the air compressor, a rotatable shaft, an exhaust outlet in communication with the burner configured to receive heated air from the burner, and an engine controller configured to control the operation of at least one of the air compressor, the burner, and the rotatable shaft in response to an input from the water evaporation tank.

In at least one form, the invention comprises an evaporation tank for use with a gas turbine engine and a water supply system, the evaporation tank comprising an exhaust inlet in communication with an exhaust outlet of the gas turbine engine, and a boiling chamber in communication with the exhaust inlet, wherein the boiling chamber is configured to receive water from the water supply system and direct heated exhaust from the gas turbine engine directly onto the water to evaporate at least a portion of the water.

BRIEF DESCRIPTION OF THE DRAWINGS

The features of exemplary embodiments of the present invention will be described with reference to the following drawings in which.

Parts given a reference numerical designation in one figure may be considered to be the same parts where they appear in other figures without a numerical designation unless specifically labelled with a different part number and described herein.

DETAILED DESCRIPTION

Figure 1:
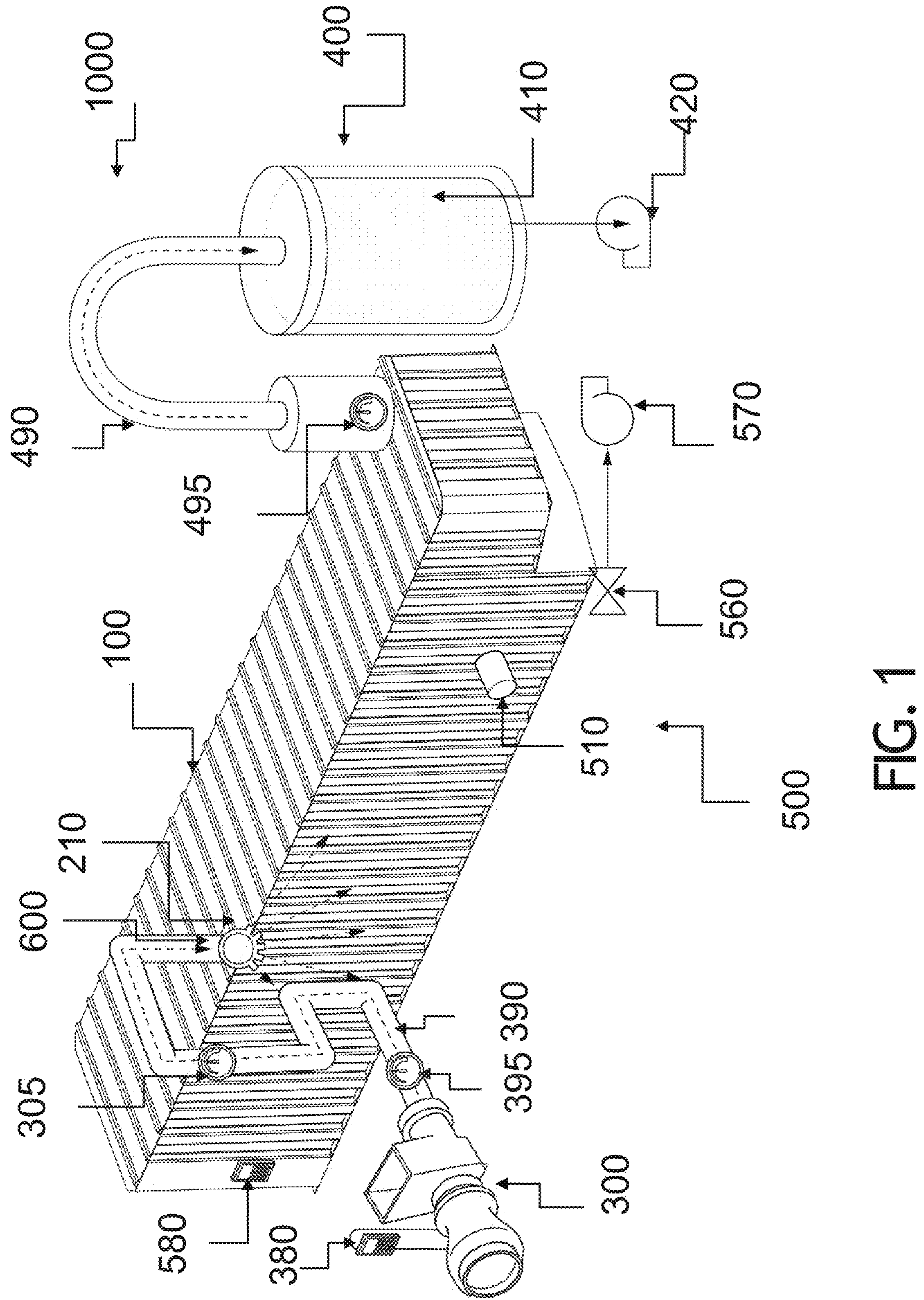
FIG. 1 is a perspective view of a water evaporation system comprising an evaporation tank.

The features and benefits of the present invention are illustrated and described herein by reference to exemplary embodiments. This description of exemplary embodiments is intended to be read in connection with the accompanying drawings, which are to be considered part of the entire written description. Such exemplary embodiments are not limiting of the present invention.

In the description of embodiments provided herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar terms refer to a relationship wherein structures are secured or attached to one another either directly or indirectly through intervening structures, as well as both movable or rigid attachments or relationships, unless expressly described otherwise.

Figure 2:
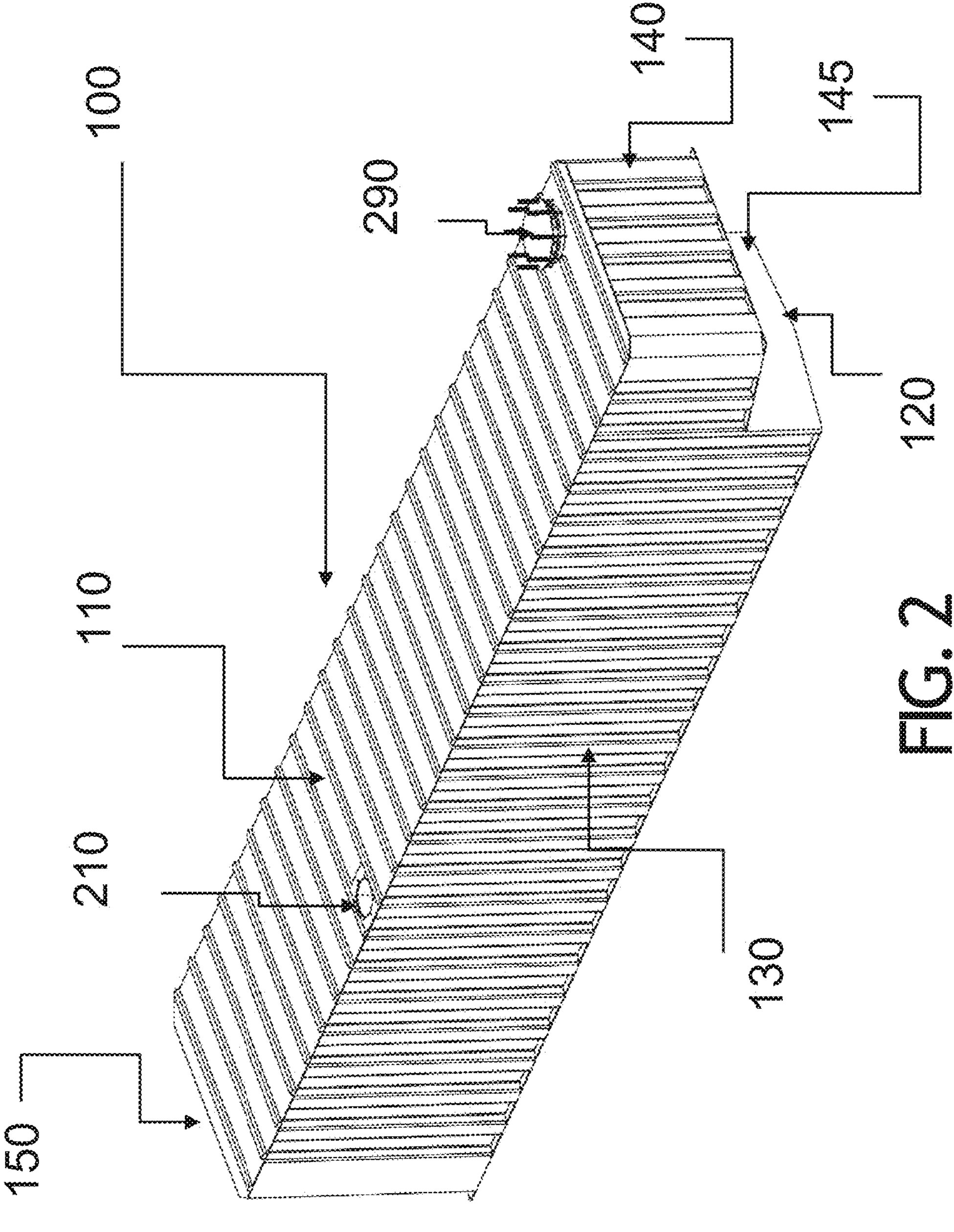
FIG. 2 is a perspective view of the evaporation tank of FIG. 1.

Referring to FIGS. 1 and 2, an evaporation system 1000 comprises an evaporation tank 100, a gas turbine engine 300, and a tank control system 500. As discussed further below, the evaporation tank 100 comprises a container configured to receive water from the tank control system 500. As also discussed further below, the turbine engine 300 is operable to create a flow of exhaust that is entrained with the water in the evaporation tank 100 to evaporate at least a portion of the water in the evaporation tank 100. The evaporated water leaves behind any contaminants, such as salt, for example, in the remaining water in the evaporation tank 100. The evaporated water is then exhausted to the environment and/or distilled and stored in a water tank storage system 400 to be released later, for example.

Referring to FIGS. 1 and 2, the evaporation tank 100 comprises a rectangular, or an at least substantially rectangular, structure. In at least one embodiment, the evaporation tank 100 comprises the shape of a frak tank, for example. That said, the evaporation tank 100 could comprise any suitable configuration such as a cylinder, for example. In various instances, the evaporation tank 100 can be a horizontal cylinder or a vertical cylinder, for example. The evaporation tank 100 comprises a top wall 110, a bottom wall 120, and opposing side walls 130 connecting the top wall 110 and the bottom wall 120. Each side wall 130 is welded to the top wall 110 and the bottom wall 120 such that a fluid-tight seal is present between the side walls 130 and the walls 110, 120. That said, the side walls 130 could be attached to the top wall 110 and the bottom wall 120 in any suitable manner. The evaporation tank 100 further comprises a first end including an end wall 145 that is welded to the top wall 110, the bottom wall 120, and the side walls 130 such that a fluid-tight seal is present between the end wall 145 and the walls 110, 120, and 130. That said, referring to FIGS. 3-7, the end wall 145 comprises a window 146 defined therein that, as discussed below, permits evaporated water to flow into an exit chamber 286 of the evaporation tank 100 that is enclosed by an end wall 140. The end wall 140 is welded to the top wall 110, the side walls 130, and the end wall 145 such that a fluid-tight seal is present between the end wall 140 and the walls 110, 130, and 145. The evaporation tank 100 further comprises a second end including a second end wall 150 that encloses the second end of the evaporation tank 100. The second end wall 150 is welded to the top wall 110, the bottom wall 120, and the side walls 130 such that a fluid-tight seal is present between the end wall 150 and the walls 110, 120, and 130. The above being said, the end walls 140, 145, and 150 can be attached to the evaporation tank 100 in any suitable manner. In various embodiments, one or more sealants can be used to seal the joints between the walls 110, 120, 130, 140, and/or 145.

Figure 8:
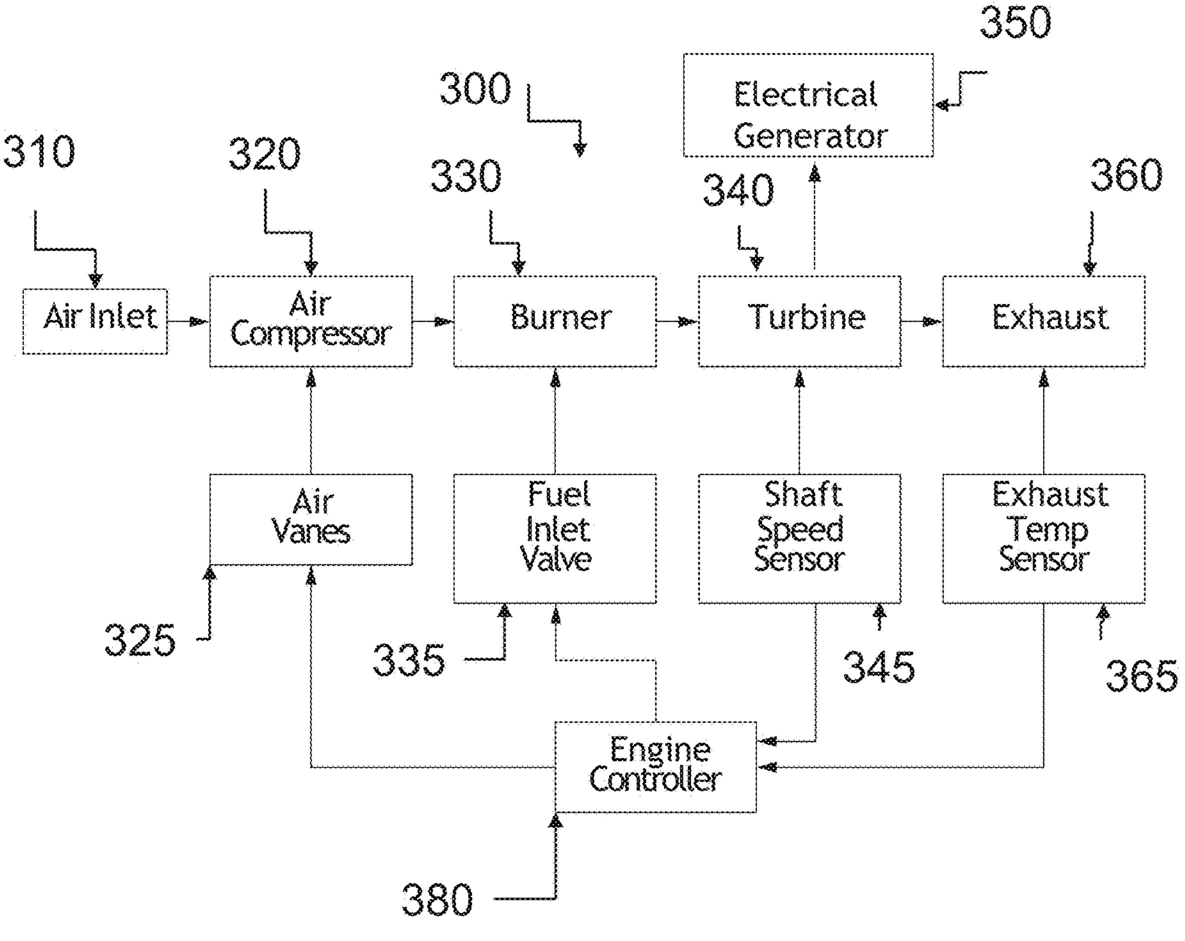
FIG. 8 is a diagram of a turbine engine of the water evaporation system of FIG. 1.

Referring to FIG. 8, the turbine engine 300 comprises, among other things, an air inlet 310 and a compressor 320. The compressor 320 is configured to draw in air from the air inlet 310, compress the air, and push the compressed air into a burner 330 of the engine 300. The compressor 320 comprises an axial compressor including one or more stages—where each stage comprises an annular array of rotor blades mounted to a compressor drive shaft that co-operate with an annular array of stationary stator blades to compress the air. In other embodiments, the compressor 320 comprises a centrifugal compressor, for example. The burner 330 is configured to burn, or combust, a fuel to heat the air as the air passes through the burner 330 and create a heated exhaust comprising the heated air and the byproducts of the combustion. In many embodiments, especially in embodiments where the engine 300 is employed at or near a natural gas well, the fuel can be natural gas or methane, for example.

Referring again to FIG. 8, the engine 300 further comprises a turbine 340 including a rotatable drive shaft comprising one or more impellers mounted thereon which are driven by the exhaust exiting the burner 330. Further to the above, the rotatable drive shaft of the turbine 340 drives the compressor drive shaft of the compressor 320. In fact, the rotatable drive shaft of the turbine 340 and the compressor drive shaft of the compressor 320 comprise one common shaft; however, in other embodiments, such drive shafts could comprise separate operably-connected shafts. The rotatable drive shaft of the turbine 340 also drives an electrical generator 350 which produces electrical power that is used to power an engine controller 380 of the engine 300. The electrical generator 350 also supplies electrical power to a tank control system 500 of the evaporation system 1000 and/or any other device or system employed in connection with the evaporation system 1000.

In various embodiments, the engine 300 comprises an auxiliary power unit (APU) turbine engine model number 331-500 manufactured by Honeywell, for example. In various embodiments, the engine 300 comprises an aircraft turbine engine, for example. In any event, as described above, the engine 300 provides a heat source that directly contacts and mixes with water in the evaporation tank 100. As also described above, the generator 350 of the engine 300 can also supply power to the evaporation system 1000 and/or an external load on the evaporation system 1000. Moreover, the compressor 320 of the engine 350 can provide a source of compressed air that can be used to operate one or more systems in a worksite surrounding the evaporation system 1000.

Referring to FIGS. 2 and 8, the evaporation system 1000 further comprises an exhaust duct 390 in communication with an exhaust outlet 360 of the engine 300. In use, the exhaust duct 390 directs the exhaust from the engine 300 into an exhaust inlet 210 defined in the evaporation tank 100. The exhaust duct 390 is illustrated with an s-curve configuration, but the exhaust duct 390 may have any suitable configuration. For instance, the exhaust duct 390 can be straight, or at least substantially straight. Also, for instance, the exhaust duct 390 can comprise an arcuate configuration, or curve, for example. In at least one embodiment, the exhaust duct 390 comprises a straight passage including one or more internal baffles that can be used to slow the engine exhaust, if needed. The engine 300, the exhaust duct 390, and/or the evaporation tank 100 have one or more pressure sensors 305 configured to sense the pressure of the exhaust passing through the exhaust duct 390 into the evaporation tank 100. The engine 300, the exhaust duct 390, and/or the evaporation tank 100 also have one or more temperature sensors 395 configured to sense the temperature of the exhaust passing through the exhaust duct 390 into the evaporation tank 100. As discussed further below, the pressure sensors 305 and the temperature sensors 395 are in communication with the controller 380 of the engine 300. As also discussed further below, the pressure sensors 305 and the temperature sensors 395 can also be in communication with a tank controller 580 of the tank control system 500.

Figure 3:
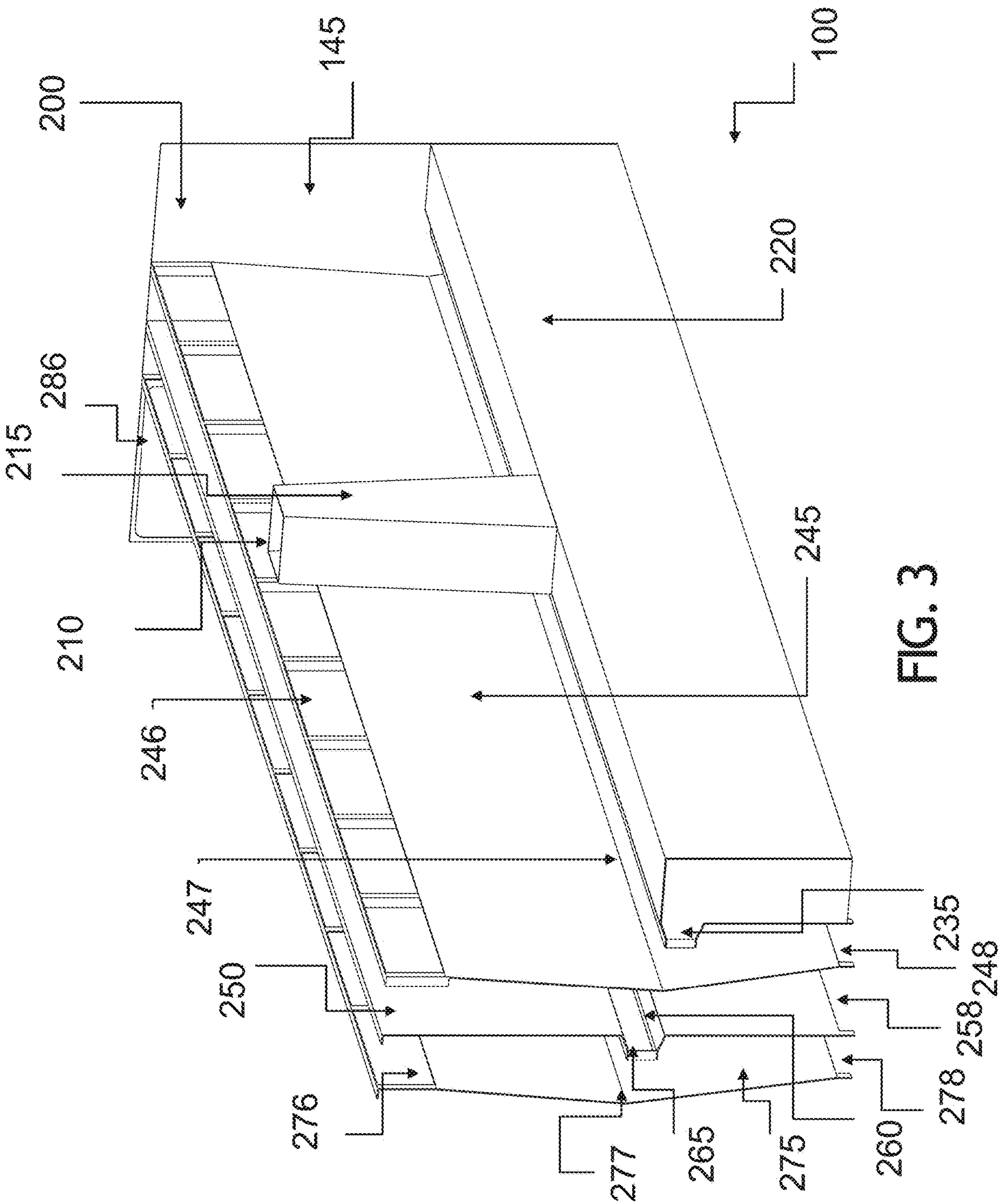
FIG. 3 is a perspective view of the evaporation tank of FIG. 1 with an outer housing of the evaporation tank removed.
Figure 4:
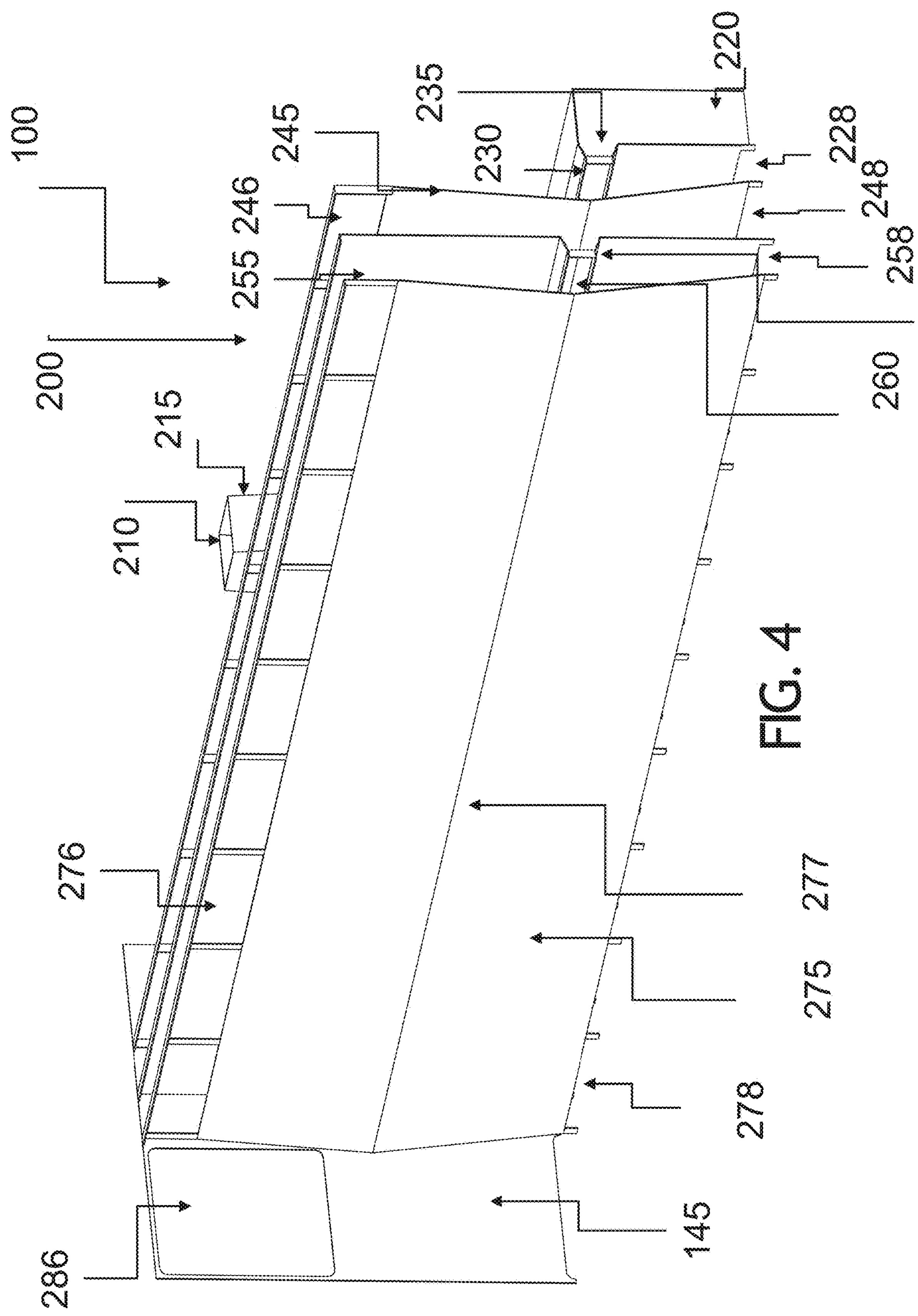
FIG. 4 is another perspective view of the evaporation tank of FIG. 1 with the outer housing of the evaporation tank removed.
Figure 5:
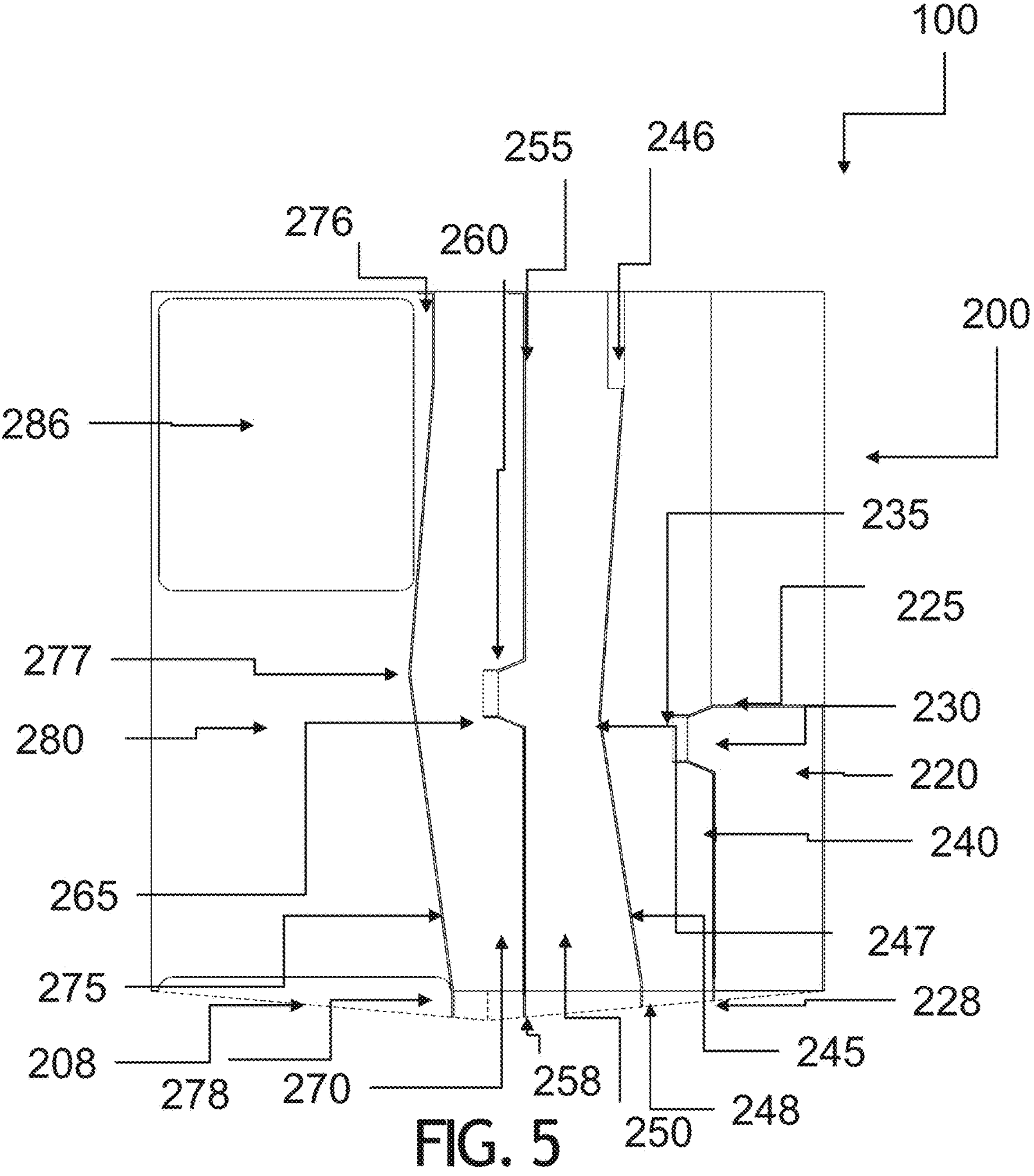
FIG. 5 is an elevational view of the evaporation tank of FIG. 1 with the outer housing of the evaporation tank removed.
Figure 6:
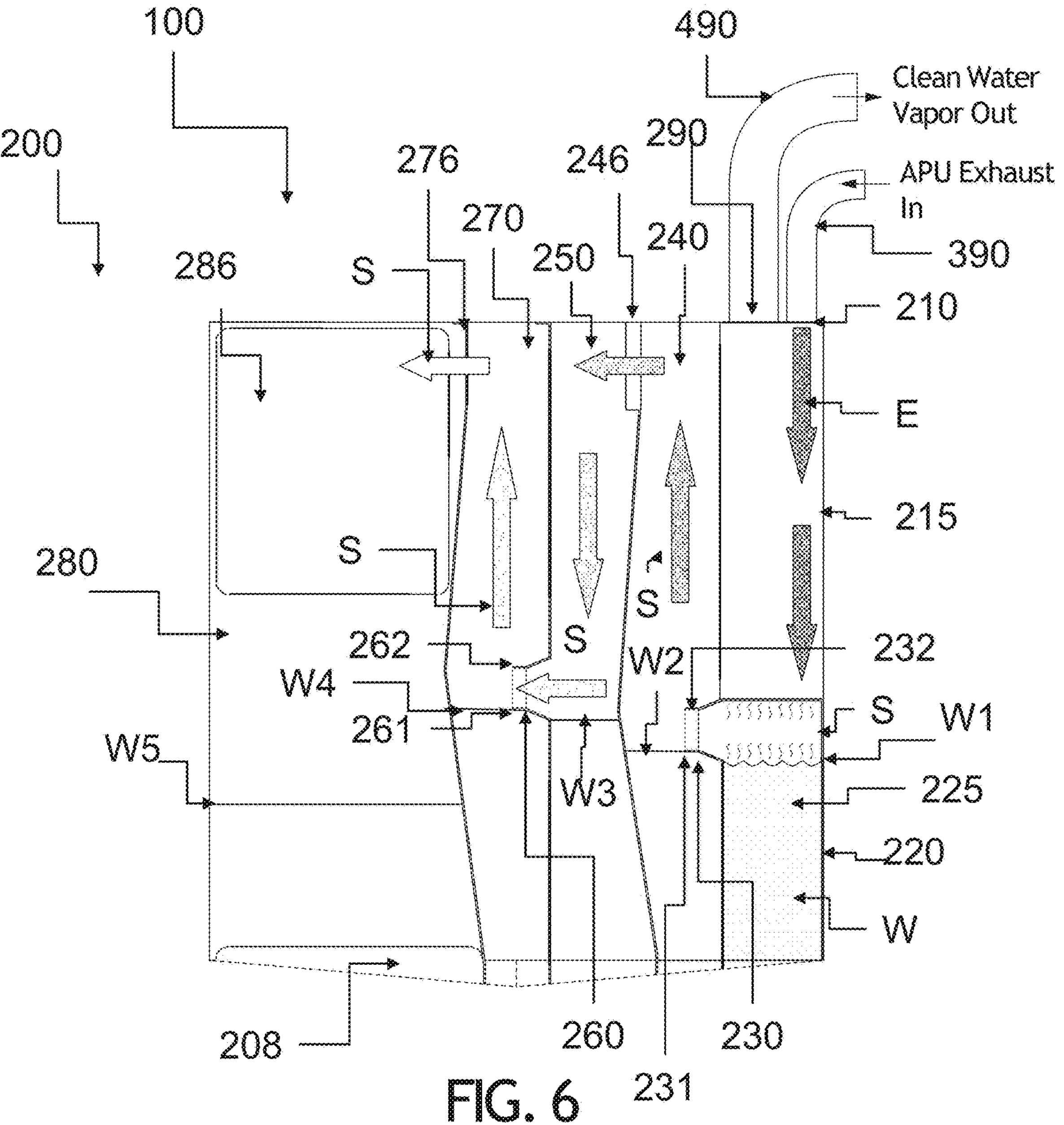
FIG. 6 is a diagram showing a flow of water entrained with exhaust entering the evaporation tank of FIG. 1.

Further to the above, referring to FIGS. 3-7, the evaporation tank 100 comprises an interior flow path 200 extending between the exhaust inlet 210 and a tank outlet 290. Referring primarily to FIG. 6, exhaust E enters into the evaporation tank 100 from the exhaust duct 390 via the exhaust inlet 210 and flows downwardly through an exhaust inlet duct 215 into an evaporation chamber, or boiling chamber, 220. The evaporation chamber 220 comprises an interior space 225 defined therein and a quantity of water W in the interior space 225. When the exhaust E enters into the interior space 225 the exhaust E directly contacts and impinges on the water W and the water W is entrained in the exhaust E. The water W in the interior space 225 of the evaporation chamber 220 is maintained at a level, or within a range of levels, by the tank control system 500 such that the exhaust E flows laterally across and into the top surface of the water W. Owing to the temperature of the exhaust being in excess of the boiling temperature of the water, i.e., 100 degrees Centigrade, a portion of the water W contacted by the exhaust E evaporates into steam and is pushed out of the evaporation chamber 220 by the flow of exhaust E, as indicated by arrow S. Referring primarily to FIGS. 3 and 4, the evaporation chamber 220 comprises an outlet, or nozzle, 230 extending longitudinally along the length thereof that is in communication with the interior space 225 defined in the evaporation chamber 220 and is configured to vent the evaporated water S and the exhaust E into a receiving chamber 240, which is discussed below. The outlet 230 is defined by flanges 235 that direct the flow of the evaporated water S and the exhaust E.

As discussed above, the exhaust E from the engine 300 comprises a heat source that directly mixes with the water W to at least partially evaporate, or boil, the water W in the evaporation chamber 220. As the exhaust E exits the exhaust inlet duct 215, the exhaust E spreads laterally across the top surface of the water W. For instance, the exhaust E can take a short path directly to the outlet 230 as well as a longer path toward the end wall 145 and the second end wall 150 of the evaporation tank 100 before passing through the outlet 230. As a result, the top surface of the water W provides a large surface area in which the evaporated water can be entrained in the exhaust. The exhaust E also pushes downwardly into the water W in the evaporation chamber 220. In at least one respect, the exhaust E creates a dent in the top surface of the water W and then pushes through into the water W. In various instances, the top surface of the water W in the evaporation chamber 220 is at, or near, a top edge 232 of the outlet 230 before the engine 300 is turned on. Once the engine 300 is turned on, the exhaust E from the engine 300 pushes the top surface of the water W in the evaporation chamber 220 downwardly to, or near, a bottom edge 231 of the outlet 230. At this level of the water W, i.e., level W1, the exhaust E can flow out of the evaporation chamber 220 through the outlet 230.

Further to the above, the chamber 240 is at least partially defined between the evaporation chamber 220 and an impingement wall, or baffle, 245 positioned opposite the outlet 230 defined in the evaporation chamber 220. The impingement wall 245 extends longitudinally alongside the evaporation chamber 220 and is welded, and/or otherwise secured to, the top wall 110, the bottom wall 120, the end wall 145, and the second end wall 150. When the evaporated water S and the exhaust E exit the evaporation chamber 220 via the outlet 230, the evaporated water S and the exhaust E impinge against the impingement wall 245. In such instances, at least some of the evaporated water S may condense and drop, or precipitate, down to the bottom of the chamber 240. The impingement wall 245 comprises an angled configuration including a vertex 247 extending longitudinally along the impingement wall 245 that is that aligned, or at least substantially aligned, with the outlet 230. The vertex 247 is vertically aligned between the nozzle flanges 235 of the outlet 230 such that the flow of evaporated water S and exhaust E can be directed upwardly and downwardly by the impingement wall 245. The flow of evaporated water S and exhaust E flowing upwardly toward the top of the chamber 240 can flow out of the chamber 240 through windows 246 defined in the top of the impingement wall 245 and into a receiving chamber 250, as discussed below.

Further to the above, the chamber 250 is defined between the impingement wall 245 and a chamber wall, or baffle, 255. Similar to the impingement wall 245, the chamber wall 255 is welded, and/or otherwise secured to, the top wall 110, the bottom wall 120, the end wall 145, and the second end wall 150. Similar to the evaporation chamber 220, the chamber wall 255 comprises an outlet, or nozzle, 260 extending longitudinally along the length thereof that is in communication with the chamber 250 and is configured to vent the evaporated water S and the exhaust E in the chamber 250 into a receiving chamber 270. In various instances, some of the evaporated water S may condense and drop, or precipitate, into the bottom of the chamber 250. Similar to the outlet 230, the outlet 260 is defined by nozzle flanges 265 that direct the flow of the evaporated water S and the exhaust E against an impingement wall 275 positioned opposite the chamber wall 250. Similar to the impingement wall 245, the impingement wall 275 is welded, and/or otherwise secured to, the top wall 110, the bottom wall 120, the end wall 145, and the second end wall 150. Also similar to the impingement wall 245, the impingement wall 275 comprises an angled configuration including a vertex 277 extending longitudinally along the impingement wall 275 that is that aligned, or at least substantially aligned, with the outlet 260. The vertex 277 is vertically aligned between the nozzle flanges 265 of the outlet 260 such that the flow of evaporated water S and exhaust E entering the chamber 270 through the outlet 260 is directed upwardly and downwardly by the impingement wall 275. The flow of evaporated water S and exhaust E flowing upwardly toward the top of the chamber 270 can flow out of the chamber 270 through windows 276 defined in the top of the impingement wall 275 into a receiving chamber 280, as discussed below.

Further to the above, the chamber 280 is defined between the impingement wall 275 and an outside wall 130 and is in communication with the exit chamber 286, discussed above, through which the evaporated water S and exhaust E can flow to an exit 290 of the evaporation tank 100. Similar to the chambers 240, 250, and 270, a portion of the evaporated water S in the chamber 280 can condense and drop, or precipitate, to the bottom of the chamber 280. Referring primarily to FIG. 3, the impingement wall 275 comprises gaps 278 defined in the bottom thereof which permit water to flow between the bottom of the chamber 280 and the bottom of the chamber 270. Similarly, the chamber wall 255 comprises gaps 258 defined in the bottom thereof which permit water to flow between the bottom of the chamber 270 and the bottom of the chamber 250. Also, similarly, the impingement wall 245 comprises gaps 248 defined in the bottom thereof which permit water to flow between the bottom of the chamber 250 and the bottom of the chamber 240. Moreover, the evaporation chamber 220 comprises gaps 228 defined therein which permit water to flow between the bottom of the chamber 240 and the interior 225 of the evaporation chamber 220. As a result of the gaps 228, 248, 258, and 278, a common reservoir 208 of water W is formed between the evaporation chamber 220, the chamber 240, the chamber 250, the chamber 270, and the chamber 280.

When the engine 300 is operating, referring again to FIG. 6, the water level in the chamber 240, i.e., level W2, can be at, or near, the bottom edge 231 of the outlet 230. That said, the water level W2 in the chamber 240 may or may not be the same as the water level W1 in the evaporation chamber 220 when the engine 300 is operating. Similarly, the water level in the chamber 250, i.e., level W3, may or may not be the same as the water level W2 in the chamber 240 and/or the water level W1 in the evaporation chamber 220 when the engine 300 is operating. In various instances, the water level W3 in the chamber 250 can be at, or near, a bottom edge 261 of the outlet 260 when the engine 300 is operating so that the exhaust E can flow through the outlet 260. Likewise, the water level in the chamber 270, i.e., level W4, can be at, or near, the bottom edge 261 of the outlet 260 when the engine 300 is operating. That said, the water level W4 in the chamber 270 may or may not be the same as the water level W3 in the chamber 250 when the engine 300 is operating. Similarly, the water level in the chamber 280, i.e., level W5, may or may not be the same as the water level W4 in the chamber 270, the water level W3 in the chamber 250, the water level W2 in the chamber 240, and/or the water level W1 in the evaporation chamber 220 when the engine 300 is operating. In various instances, the water levels W1, W2, W3, W4, and W5 may be the same when the engine 300 is not operating but will self-adjust to suitable levels when the engine 300 is operating. Moreover, in various instances, the water levels W1, W2, W3, W4, and W5 are sufficient such that exhaust E does not flow through the gaps 228, 248, 258, and 278 at the bottom of the evaporation tank 100.

Further to the above, the outlets 230 and 260 are positioned and arranged in any suitable manner to achieve a desired flow path. Referring again to FIG. 6, the top edge 232 of the outlet 230 is vertically aligned with the bottom edge 261 of the outlet 260. In such embodiments, a top edge 262 of the outlet 260 is positioned vertically above the top edge 232 of the outlet 230. That said, other embodiments are envisioned in which the top edge 232 of the outlet 230 is not vertically aligned with the bottom edge 261 of the outlet 260.

Further to the above, the interior flow path 200 of the evaporation tank 100 comprises a tortuous path through which the exhaust E evaporates water W. In various instances, the exhaust E can evaporate water W in the chambers 240, 250, 270, and 280 as well as the evaporation chamber 220. This path can have high velocity zones and low velocity zones along which the exhaust E can, generally, slow down to a desirable speed and/or cool down to a desirable temperature. To achieve this, among other things, the evaporation tank 100 can comprise any suitable number of walls, such as walls 245, 255, and 275, for example, chambers, such as chambers 240, 250, 270, and 280, for example, and/or outlets or nozzles, such as outlets 230 and 260, for example.

Further to the above, referring again to FIG. 2, the evaporation tank exit 290 is in communication with the tank storage system 400 via a duct, or pipe, 490 such that the evaporated water S and exhaust E flowing out of the evaporation tank 100 are directed into a water tank 410. In the water tank 410, the evaporated water S can condense and collect therein while the exhaust E can escape from a vent defined in the water tank 410. As a result of the above, the condensed water in the water tank 410 is free, or at least substantially free, of the salt and/or other contaminants that are present in the water W in the evaporation tank 100. The water in the water tank 410 can be used for any suitable industrial purpose and/or, depending on the circumstances, released into the surrounding environment. The tank storage system 400 further comprises a pump 420, for example, which can be operated to discharge the water from the water tank 410. In various embodiments, the pump 420 is in communication with the controller 580 of the tank control system 500 and can be operated by the controller 580. In certain embodiments, the tank storage system 400 comprises its own controller which can control the operation of the pump 420. In at least one embodiment, the water evaporation system 1000 does not comprise a tank storage system 400 and, instead, the evaporated water S exiting the evaporation tank 100 can be exhausted directly into the atmosphere.

Figure 2A:
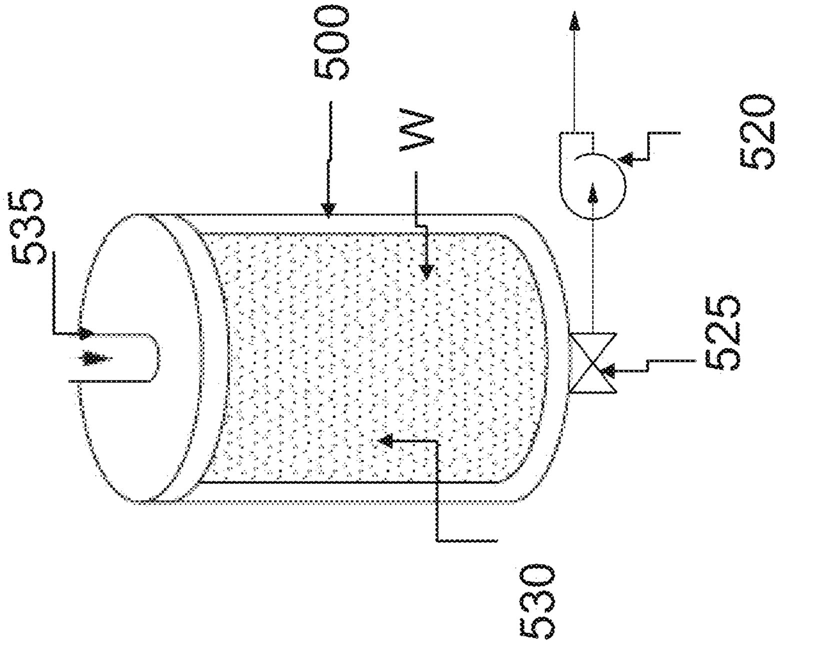
FIG. 2A is a perspective view of a water supply tank of the water evaporation system of FIG. 1.
Figure 7:
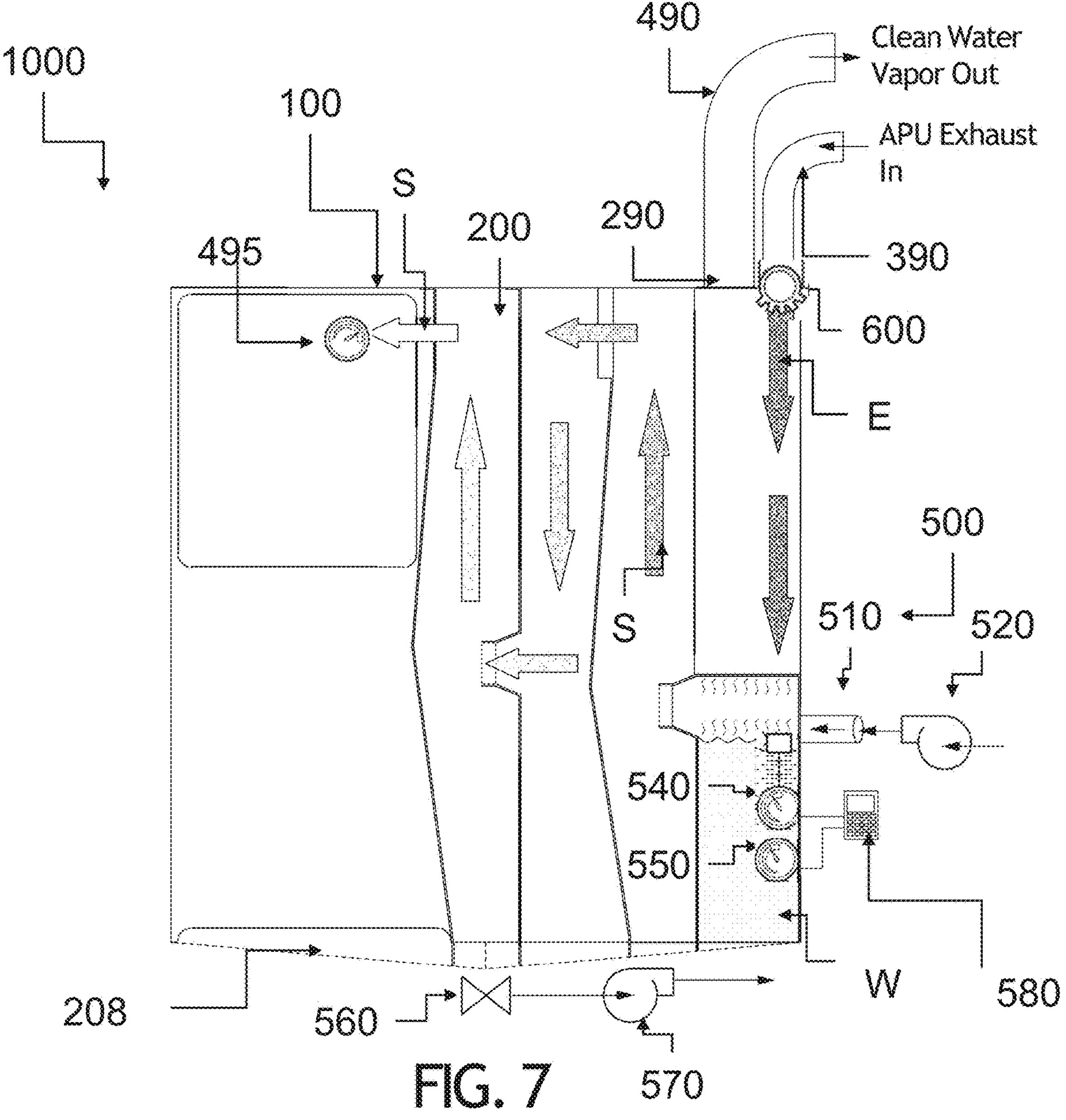
FIG. 7 is a diagram depicting a control system of the water evaporation system of FIG. 1.

As discussed above, the impingement of the exhaust from the engine 300 against the water W contained in the evaporation tank 100 evaporates the water W. Over time, absent more, the volume of water W in the evaporation tank 100 will be reduced. In such instances, the back pressure on the engine 300 may change which may affect the operation of the engine 300. To maintain a sufficiently constant back pressure on the engine 300, among other things, the level of the water W in the evaporation tank 100 can be controlled by the tank control system 500. The tank control system 500 further comprises at least one water level sensor 540 in signal communication with the tank controller 580 which is configured to sense the level of water W in the evaporation tank 100. The water level sensor 540 is positioned in the evaporation chamber 220, but could be positioned in any suitable location in the evaporation tank 100. Referring to FIGS. 2A and 7, the tank controller 580 is configured to supply water W to the evaporation tank 100 from a wastewater tank 530 when the tank controller 580 determines that the water level in the evaporation tank 100 is below a predetermined threshold. The tank control system 500 further comprises a wastewater supply line in communication with a water inlet 510 in the evaporation tank 100. The wastewater supply line comprises a valve 525 in fluidic communication with the wastewater tank 530 and a pump 520 in fluidic communication with the valve 525. The valve 525 and the pump 520 are in signal communication with the tank controller 580 and are operable by the tank controller 580 to pump waste water from the waste water tank 530 into the evaporation tank 100 through the water inlet 510. When the tank controller 580 determines that a sufficient amount of water W is in the evaporation tank 100, the controller 580 closes the valve 525 and stops the pump 520.

Further to the above, the tank control system 500 further comprises a drain configured to remove water W from the evaporation tank 100 if, for instance, the level of the water W in the evaporation tank 100 is above a predetermined threshold. To this end, the tank control system 500 further comprises a drain valve 560 that is in fluidic communication with the bottom of the evaporation tank 100 and a drain pump 570 in fluidic communication with the drain valve 560. The drain valve 560 and the drain pump 570 are in signal communication with the tank controller 580 and are operable by the tank controller 580. When the tank controller 580 determines that the water level in the evaporation tank 100 exceeds a predetermined threshold, or exceeds a predetermined range, via a water level sensor, the tank controller 580 opens the drain valve 560 and operates the drain pump 570 to remove water from the evaporation tank 100. The drain pump 570 is in fluid communication with an inlet 535 the wastewater tank 530 via one or more pipes such that the excess wastewater can be returned to the wastewater tank 530. When the tank controller 580 determines that the water level in the evaporation tank 100 is below or at the predetermined threshold, or is within a predetermined range, the tank controller 580 closes the drain valve 560 and stops the drain pump 570.

In various instances, further to the above, the evaporation of the water W in the evaporation tank 100 can cause the concentration of the salt in the remaining water in the evaporation tank 100 to increase. In some instances, the salt in the water W can precipitate when the salt concentration is high. Further to the above, the tank control system 500 further comprises at least one salinity sensor 550 positioned in the evaporation tank 100. The salinity sensor 550 is in signal communication with the tank controller 580 and is configured to detect the salt content of the water W in the evaporation tank 100. In various embodiments, the tank controller 580 is configured to add water W from the wastewater tank 530, further to the above, in the event that the salinity of the water W in the evaporation tank 100 exceeds a predetermined threshold. In various instances, the salinity of the water W can be reduced below the predetermined threshold and, at such point, the tank controller 100 can stop the water pump 520. In some instances, however, the salinity of the water W may not fall below the predetermined threshold by adding water from the wastewater tank 530. In such circumstances, the controller 580 is configured to add water from wastewater tank 530 until the level of the water W in the evaporation tank 100 reaches a predetermined threshold and, at such point, stop the water pump 520. In some instances, the controller 580 is configured to drain the high salinity water from the evaporation tank 100 by opening the drain valve 560 and operating the drain pump 570.

In various embodiments, the water evaporation system 1000 can be operated until a sufficient amount of water in the evaporation tank 100 has been evaporated to create a crystalline salt cake, for example. In various instances, the crystalline salt cake can be removed from the evaporation tank 100 and used elsewhere.

Further to the above, the tank controller 580 comprises a processor, one or more memory devices in communication with the processor, and one or more communication devices configured to communicate data between the sensors 540, 550 and the processor of the controller 580. In various embodiments, the communication devices of the controller 580 comprise one or more wired circuits extending between the controller 580 and the sensors 540, 550. In at least one embodiment, the communication devices of the controller 580 comprise a receiver circuit configured to receive wireless signals emitted from the sensors 540, 550. In at least one such embodiment, each sensor 540, 550 comprises a wireless signal transmitter circuit and an antenna configured to generate and emit wireless signals. In certain embodiments, the sensors 540, 550 are configured to receive data, such as calibration data, for example, from the controller 580. In at least one such embodiment, each sensor 540, 550 comprises a receiver circuit configured to receive wireless signals emitted from a wireless signal transmitter circuit and antenna of the controller 580.

As described above, the controller 380 of the engine 300 comprises a control system that controls the operation of the engine 300. The engine controller 380 comprises a processor, one or more memory devices in communication with the processor, and one or more communication devices configured to communicate data between the pressure sensor 305, temperature sensor 395 and the processor of the engine controller 380. In various embodiments, the communication devices of the engine controller 380 comprise one or more wired circuits extending between the controller 380 and the sensors 305, 395. In at least one embodiment, the communication devices of the engine controller 380 comprise a receiver circuit configured to receive wireless signals emitted from the sensors 305, 395. In at least one such embodiment, each sensor 305, 395 comprises a wireless signal transmitter circuit and an antenna configured to generate and emit wireless signals. In certain embodiments, the sensors 305, 395 are configured to receive data, such as calibration data, for example, from the engine controller 380. In at least one such embodiment, each sensor 305, 395 comprises a receiver circuit configured to receive wireless signals emitted from a wireless signal transmitter circuit and antenna of the engine controller 380. In at least one embodiment, referring to FIG. 8, the engine 300 comprises a temperature sensor 365 configured to detect the temperature of the exhaust exiting the engine 300 that is in communication with the engine controller 380.

With data from the pressure sensor 305, the temperature sensor 365, and/or the temperature sensor 395, further to the above, the engine controller 380 can modify the operation of the engine 300. In various embodiments, referring to FIG. 8, the air compressor 320 of the engine 300 comprises one or more movable air vanes 325 that are movable by at least one stepper motor, for example, in communication with the engine controller 380. In use, the engine controller 380 can operate the stepper motor to control the position of the air vanes and the flow of air into the air compressor 320. Also, in various embodiments, the engine 300 further comprises a fuel inlet valve 335 in communication with the engine controller 380. In use, the engine controller 380 can operate the fuel inlet valve 335 to control the amount of fuel entering into the burner 330. By controlling the compressed air and/or fuel that enter into the burner 330, the engine controller 380 can control the speed of the turbine drive shaft. In various embodiments, the engine 300 further comprises a shaft speed sensor 345 in signal communication with the engine controller 380 that is configured to detect the rotational speed of the turbine drive shaft. In at least one embodiment, the engine controller 380 is configured to increase the speed of the turbine drive shaft by controlling the air vanes 325 and/or the fuel inlet valve 335 to increase the amount of compressed air and/or fuel entering into the turbine 340 and, correspondingly, the engine controller 380 is configured to decrease the speed of the turbine drive shaft by controlling the air vanes 325 and/or the fuel inlet valve 335 to decrease the amount of compressed air and/or fuel entering into the turbine 340.

In various embodiments, further to the above, the engine controller 380 can communicate with the tank controller 580 to affect or change the operation of the tank control system 500. Moreover, the tank controller 580 can communicate with the engine controller 380 to affect or change the operation of the engine 300. For instance, the engine controller 380 can communicate with the tank controller 580 during a start-up procedure of the water evaporation system 1000. When the engine 300 is started, it may take time for the turbine shaft to come up to speed. Once the turbine shaft is rotating at a speed within a predetermined operational range, the engine controller 380 can transmit a start signal to the tank controller 580 indicating that the engine 300 is ready for operation. At such point, the engine controller 580 can begin to supply wastewater to the evaporation tank 100, as discussed above. In various embodiments, the water evaporation system 1000 further comprises a flow diverter 600 in communication with the engine controller 580 that is configured to divert the exhaust of the engine 300 away from the exhaust inlet 210 of the evaporation tank 100 until the engine 300 is ready for operation. Once the tank controller 580 has received the start signal from the engine controller 380, the tank controller 580 can shift the flow diverter 600 into a second state in which the exhaust of the engine 300 flows into the evaporation tank 100, as discussed above. In various embodiments, the engine controller 380 and the tank controller 580 are in signal communication with each other via one or more wires. In certain embodiments, the engine controller 380 and the tank controller 580 can communicate wirelessly. In at least one such embodiment, the engine controller 380 and the tank controller 580 each have a wireless signal transmitter and a wireless signal receiver, for example.

Referring again to FIG. 2, the evaporation tank 100 further comprises at least one exhaust temperature sensor 495 configured to sense the temperature of the water vapor S and/or the exhaust E exiting the evaporation tank 100. The exhaust temperature sensor 495 is in signal communication with the tank controller 580 and/or the engine controller 380 through a wired and/or wireless connection. Using data from the temperature sensor 495, the engine controller 380 and/or the tank controller 580 can change the operation of the engine 300. For instance, if the engine controller 380 and/or the tank controller 580 determines that the temperature of the water vapor S and/or the exhaust E is below a predetermined threshold, the engine controller 380 and/or the tank controller 580 can shift the operation of the engine 300 to increase the temperature of its exhaust E.

In various embodiments, the engine controller 380 and/or the tank controller 580 of the evaporation system 1000 are configured to communicate with, transmit data to, and/or receive data from another computer, computer network, server, and/or server network, such as the internet, for example. Such communication can occur wirelessly through a wireless transmitter and/or receiver, for example, and/or through a wired connection. In at least one embodiment, such a computer, for example, is located off-site, or remotely with respect to the evaporation tank 100 and engine 300. In various embodiments, an off-site computer, or hub, is configured to receive and collect data from the engine controller 380 and/or the tank controller 580 of one or more evaporation systems 1000. In at least one such embodiment, the hub comprises at least one processor and one or more software programs and/or algorithms implemented by the processor that are configured to evaluate the data from the one or more evaporation systems 1000, discern patterns and/or trends in the data, and/or output one or more relationships regarding the data, for example. Such patterns, trends, and/or relationships may be derived from the data provided by one evaporation system 1000 and/or, collectively, more than one evaporation system 1000. In various embodiments, the hub is configured to transmit the one or more relationships established by the hub, and/or data and/or instructions related to such relationships, to one or more of the engine controllers 380 and/or tank controllers 580 of the evaporation systems 1000 in communication with the hub. In response to receiving such data and/or instructions from the hub, one or more of the evaporation systems 1000 can modify their operating algorithms to change the manner, or manners, in which it operates in some way. For instance, an evaporation system 1000 can modify one or more predetermined thresholds, such as the predetermined thresholds disclosed herein, for example, contained in their algorithms and/or a memory device in response to receiving the data and/or instructions from the hub.

In various embodiments, as discussed above, an evaporation system 1000 can be used to treat water from a natural gas well. Further to the above, a network of evaporation systems 1000 can be in communication with one another and/or in communication with a central computer, or hub, that can transmit, receive, collect, process, and/or evaluate the data from the evaporation systems 1000. In various instances, the data received by the hub from the evaporation systems 1000, and/or the patterns, trends, and/or relationships discerned by the hub, can be used by the hub to determine an optimum, or an at least suitable, location and/or depth to sink another gas well. In at least one embodiment, the salinity of the water being deposited into the evaporation systems 1000 from their corresponding natural gas wells can be evaluated by the hub to determine a location and/or depth of another possible gas well, for example. In at least one such embodiment, the hub has data regarding, and/or related to, the properties in one or more regions, the geologies and/or hydrologies of the properties, and/or the ownership of the properties, and/or can access such information stored in a computer and/or memory device, that can be used by the hub as part of making such a determination.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently-disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

The invention claimed is:

1. A water evaporation system, comprising:

a gas turbine engine, comprising:
- an air compressor;
- a burner in fluidic communication with the air compressor;
- a rotatable shaft; and
- an exhaust outlet in communication with the burner configured to receive heated air from the burner; and an evaporation tank, comprising:
- an exhaust inlet in communication with the exhaust outlet of the gas turbine engine;
- a water supply system; and
- a boiling chamber in communication with the exhaust inlet, wherein the boiling chamber is configured to receive water from the water supply system and direct heated exhaust from the gas turbine engine directly onto the water to evaporate at least a portion of the water, wherein the boiling chamber comprises an interior volume in communication with the exhaust inlet and a nozzle extending longitudinally along the boiling chamber that directs the heated exhaust received in the interior volume out of the interior volume, wherein the evaporation tank further comprises a baffle positioned opposite the nozzle such that a flow of evaporated water from the boiling chamber through the nozzle impinges on the baffle, wherein the baffle comprises a first wall portion and a second wall portion that meet at a vertex, wherein the vertex is vertically aligned with the nozzle, wherein the first wall portion comprises a first angled surface that faces the nozzle and is pitched away from the nozzle, and wherein the second wall portion comprises a second angled surface that faces the nozzle and is pitched away the nozzle.

2. The water evaporation system of claim 1, wherein the baffle and the boiling chamber define a receiving chamber in fluid communication with the interior volume.

3. The water evaporation system of claim 1, wherein the evaporation tank comprises a tank control system in communication with the water supply system, and wherein the tank control system is configured to control the level of water in the boiling chamber.

4. The water evaporation system of claim 3, wherein the tank control system comprises a water level sensor configured to sense the level of water in the boiling chamber.

5. The water evaporation system of claim 3, wherein the tank control system is configured to control a backpressure on the heated exhaust exiting the exhaust outlet of the gas turbine engine.

6. The water evaporation system of claim 3, wherein the turbine engine further comprises an engine controller configured to control the rotational speed of the drive shaft, and wherein the engine controller is in communication with the tank control system.

7. The water evaporation system of claim 6, wherein the engine controller is configured to transmit a signal to the tank control system when the drive shaft is rotating at a speed within a range of operational speeds between a first operational speed and a second operational speed.

8. The water evaporation system of claim 7, wherein the water supply system comprises a pump in communication with a water source, wherein the tank control system is in communication with the pump, and wherein the tank control system is configured to operate the pump in response to the signal from the engine controller.

9. The water evaporation system of claim 3, wherein the gas turbine engine further comprises an electrical generator configured to supply electrical power to the tank control system.

10. The water evaporation system of claim 1, wherein the evaporation tank further comprises a tank control system configured to transmit data to the gas turbine engine.

11. The water evaporation system of claim 1, wherein the evaporation tank further comprises a tank control system configured to control an operational aspect of the gas turbine engine.

12. The water evaporation system of claim 1, wherein the boiling chamber comprises an interior volume in communication with the exhaust inlet and a series of nozzles configured to entrain the water in the heated exhaust flowing through the nozzles.

13. The water evaporation system of claim 1, wherein the exhaust inlet is positioned directly above and pointed directly downwardly at the water in the boiling chamber.

14. A water evaporation system, comprising:

a gas turbine engine, comprising:
  - an air compressor;
  - a burner in fluidic communication with the air compressor;
  - a rotatable shaft; and
  - an exhaust outlet in communication with the burner configured to receive heated air from the burner; and an evaporation tank, comprising:
  - an exhaust inlet in communication with the exhaust outlet of the gas turbine engine;
  - a water supply system; and
  - a boiling chamber in communication with the exhaust inlet, wherein the boiling chamber is configured to receive water from the water supply system and direct heated exhaust from the gas turbine engine directly onto the water to evaporate at least a portion of the water, wherein the boiling chamber comprises an interior volume in communication with the exhaust inlet and a nozzle extending longitudinally along the boiling chamber that directs the heated exhaust received in the interior volume out of the interior volume, wherein the evaporation tank further comprises a baffle positioned opposite the nozzle such that a flow of evaporated water from the boiling chamber through the nozzle impinges on the baffle, wherein the baffle comprises a first wall portion and a second wall portion that meet at a vertex, wherein the vertex is vertically aligned with the nozzle, and wherein the baffle comprises at least one window defined therein that is positioned above the vertex and configured to vent the flow of evaporated water toward an outlet of the evaporation tank.

15. The water evaporation system of claim 14, wherein the evaporation tank comprises a tank control system in communication with the water supply system, and wherein the tank control system is configured to control the level of water in the boiling chamber.

16. The water evaporation system of claim 15, wherein the tank control system is configured to control a backpressure on the heated exhaust exiting the exhaust outlet of the gas turbine engine.

17. The water evaporation system of claim 15, wherein the turbine engine further comprises an engine controller configured to control the rotational speed of the drive shaft, and wherein the engine controller is in communication with the tank control system.

18. The water evaporation system of claim 17, wherein the engine controller is configured to transmit a signal to the tank control system when the drive shaft is rotating at a speed within a range of operational speeds between a first operational speed and a second operational speed.

19. The water evaporation system of claim 18, wherein the water supply system comprises a pump in communication with a water source, wherein the tank control system is in communication with the pump, and wherein the tank control system is configured to operate the pump in response to the signal from the engine controller.

20. The water evaporation system of claim 14, wherein the evaporation tank further comprises a tank control system configured to transmit data to the gas turbine engine.

21. The water evaporation system of claim 14, wherein the evaporation tank further comprises a tank control system configured to control an operational aspect of the gas turbine engine.

22. An evaporation tank for use with a gas turbine engine and a water supply system, the evaporation tank comprising:

an exhaust inlet in communication with an exhaust outlet of the gas turbine engine;

a boiling chamber in communication with the exhaust inlet, wherein the boiling chamber is configured to receive water from the water supply system and direct heated exhaust from the gas turbine engine directly onto the water to evaporate at least a portion of the water;

a plurality of baffles configured to control a flow of evaporated water; and a plurality of nozzles configured to control the flow of evaporated water, wherein at least one of the nozzles is defined in a said baffle.

* * * * *